United States Patent
Lu

(10) Patent No.: US 10,928,266 B2
(45) Date of Patent: Feb. 23, 2021

(54) MOBILE DEVICE AND METHOD FOR CHANGING CENTROID THEREOF

(71) Applicants: Beijing BOE Optoelectronics Technology Co., Ltd., Beijing (CN); BOE TECHNOLOGY GROUP CO., LTD., Beijing (CN)

(72) Inventor: Yuanjie Lu, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 229 days.

(21) Appl. No.: 16/114,176

(22) Filed: Aug. 27, 2018

(65) Prior Publication Data

US 2019/0301962 A1 Oct. 3, 2019

(30) Foreign Application Priority Data

Mar. 27, 2018 (CN) .......................... 201810259845.0

(51) Int. Cl.
*G01M 1/12* (2006.01)
*A63F 13/211* (2014.01)
(Continued)

(52) U.S. Cl.
CPC .......... *G01M 1/122* (2013.01); *A63F 13/211* (2014.09); *A63F 13/98* (2014.09); *G06F 3/016* (2013.01); *A63F 2300/105* (2013.01); *A63F 2300/1043* (2013.01); *G01P 15/135* (2013.01); *G01P 15/14* (2013.01)

(58) Field of Classification Search
CPC . G01M 1/122; A63F 13/211; A63F 2300/105; G06F 3/016; G01P 15/135; G01P 15/14
See application file for complete search history.

(56) References Cited

U.S. PATENT DOCUMENTS 8,798,534 B2 * 8/2014 Rodriguez ....... H04N 21/44008
455/41.1
10,502,644 B2 * 12/2019 Ono ........................ G06F 3/016
(Continued)

FOREIGN PATENT DOCUMENTS

CN 103324411 A 9/2013
CN 103901944 A 7/2014
(Continued)

OTHER PUBLICATIONS

First Office Action issued in Chinese Application No. 201810259845.0 dated Sep. 2, 2020 with English translation (18p).

*Primary Examiner* — Nidhi Thaker
(74) *Attorney, Agent, or Firm* — Arch & Lake LLP

(57) ABSTRACT

The present disclosure provides a mobile device and a method of changing the centroid thereof. The mobile device includes a device body, having a processor disposed therein; and a centroid changing device, including a guide rail disposed on the device body, a weight assembly slidably disposed on the guide rail, and a driving device coupled to the weight assembly, wherein the processor is electrically coupled to the driving device, and controls the weight assembly to slide along the guide rail via the driving device, to change the centroid of the device body.

13 Claims, 3 Drawing Sheets

(51) Int. Cl.
  *A63F 13/98* (2014.01)
  *G06F 3/01* (2006.01)
  *G01P 15/135* (2006.01)
  *G01P 15/14* (2013.01)

(56) References Cited

U.S. PATENT DOCUMENTS 10,566,888 B2 * 2/2020 Degner ................ H02K 33/18
2016/0258758 A1 * 9/2016 Houston ............... G01C 21/20
2018/0369865 A1 * 12/2018 Shoji .................... A63F 13/285

FOREIGN PATENT DOCUMENTS

CN       104049729 A    9/2014
EP       1208886 A2     5/2002

* cited by examiner

MOBILE DEVICE AND METHOD FOR CHANGING CENTROID THEREOF

CROSS REFERENCE

The present application is based upon and claims priority to Chinese Patent Application No. 201810259845.0, filed on Mar. 27, 2018, and the entire contents thereof are incorporated herein by reference.

TECHNICAL FIELD

The present disclosure relates to the field of mobile devices, and more particularly to a mobile device and a method of changing the centroid thereof.

BACKGROUND

With the development of technology, traditional games becomes further and further away from satisfying people's pursuit of realism in the game experience. In today's market, most people use mobile devices to play games, such as mobile phones and virtual reality gaming devices. The gaming experience may be enhanced by adding components such as motors or gravity sensors to these devices.

It should be noted that, information disclosed in the above background portion is provided only for better understanding of the background of the present disclosure, and thus it may contain information that does not form the prior art known by those ordinary skilled in the art.

SUMMARY

According to one aspect, the present disclosure provides a mobile device. The mobile device includes a device body, a centroid changing device, a weight assembly, and a driving device. The device includes a processor disposed therein. The centroid changing device includes a guide rail disposed on the device body. The weight assembly is slidably disposed on the guide rail. The driving device is coupled to the weight assembly. The processor is electrically coupled to the driving device and controls the weight assembly to slide along the guide rail via the driving device to change the centroid of the device body.

In some arrangements, the guide rail includes a first rail and a second rail. The first rail is parallel to a length direction of the device body. The second rail is parallel to a width direction of the device body. The weight assembly is slidably disposed on the first rail and the second rail, respectively. In some arrangements, the first rail is intersect with and perpendicular to the second rail. In some arrangements, the first rail is disposed at a first angle with a length direction of the device body, and the second rail is disposed at a second angle with a width direction of the device body. In some arrangements, the first angle is between 0° and 90°, and the second angle is between 0° and 90°. In some arrangements, an intersection between the first rail and the second rail is located at a center of the front side of the device body. In some arrangements, a spacing is provided between the first rail and the second rail that allows the weight assembly to pass through. In some arrangements, a height of the spacing is equal to or greater than a sum of a height of the weight assembly on the first rail and a height of the weight assembly on the second rail. In some arrangements, the weight assembly on the first rail is disposed on a side of the first rail away from the second rail, and the weight assembly on the second rail is disposed on a side of the second rail away from the first rail. In some arrangements, the guide rail extends across the device body. In some arrangements, the weight assembly includes a battery, a support member, and a sliding connector that are sequentially connected in the device body, and the sliding connector is slidably disposed on the guide rail.

In some arrangements, a power source connector is provided in the device body, and the power source connector is electrically connected to the battery. In some arrangements, the device body includes a mobile phone, a gamepad, a virtual helmet, a handheld computer or a handheld game console. In some arrangements, the device body is provided with at least one of a button and a gyroscope.

According to one aspect, the present disclosure provides a method of changing centroid of any one of the above mobile devices. The method includes: reading, by the processor, instruction for changing the centroid sent from the device body; and according to the instruction for changing the centroid, controlling, by the processor, the weight assembly to slide on the guide rail through the driving device. In some arrangements, the weight assembly is located at a center of the front side of the device body before the processor reads the instruction for changing the centroid.

Other features and advantages of the present disclosure will be set forth in the description which follows. The objectives and other advantages of the present disclosure can be realized and obtained by the structure of the disclosure. It is to be understood that both the foregoing general description and the following detailed description are exemplary and explanatory only and are not restrictive of the disclosure. This section provides a summary of various implementations or examples of the technology described in the disclosure, and is not a comprehensive disclosure of the full scope or all features of the disclosed technology.

BRIEF DESCRIPTION OF THE DRAWINGS

The accompanying drawings are enclosed to provide a further understanding of the present disclosure and constitute a part of the specification, and together with the following detailed description, to serve for explanation of the present disclosure. But the accompanying drawings are not to be construed as limiting the present disclosure.

DETAILED DESCRIPTION

The arrangements of the present disclosure will be described in detail below with reference to the accompanying drawings. It should be noted that, the features in the arrangements and the arrangements in the present application may be arbitrarily combined with each other unless being conflicted.

Figure 1:
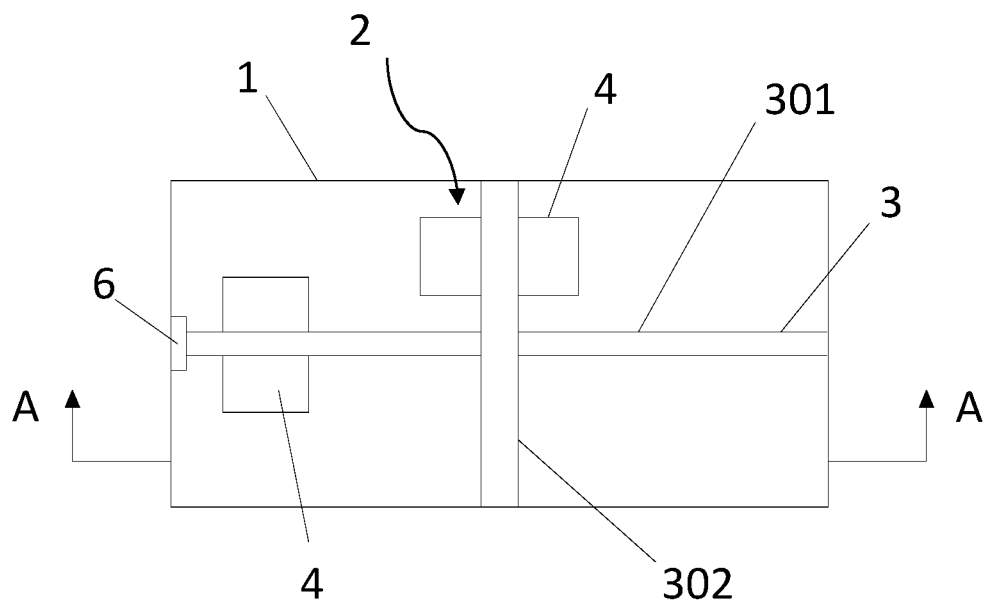
FIG. 1 is a cross sectional view of a front side of the mobile device according to the present disclosure.
Figure 2:
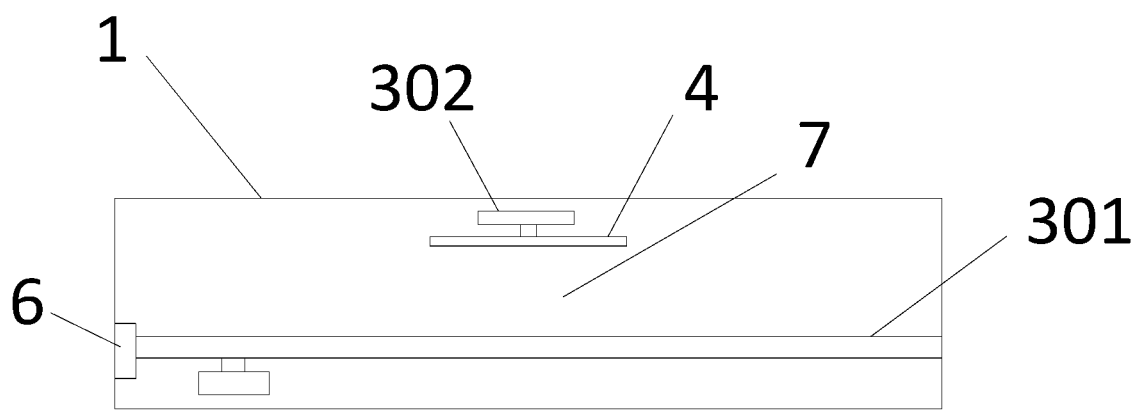
FIG. 2 is a cross sectional view taken along A-A direction of FIG. 1.
Figure 3:
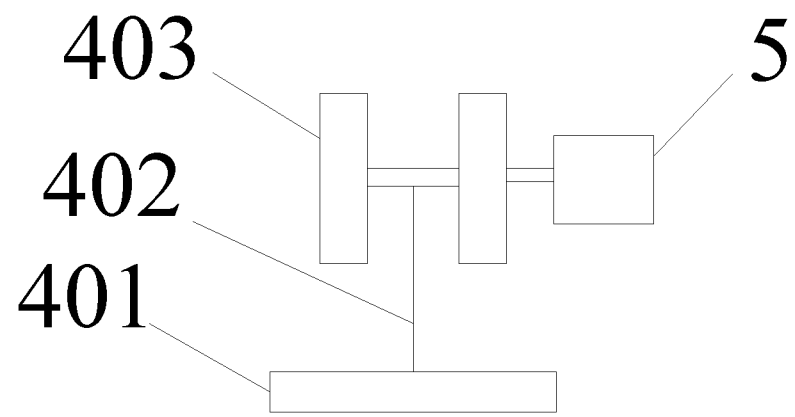
FIG. 3 is a structural schematic view of the centroid changing device in the mobile device according to the present disclosure.

As illustrated in FIG. 1, FIG. 2 and FIG. 3, at least one arrangement of the present disclosure provides a mobile device including a device body 1, a centroid changing device 2, a guide rail 3, a weight assembly 4, and a driving device 5. The device body 1 includes a processor disposed therein. The centroid changing device 2 includes a guide rail 3 disposed on the device body 1. The weight assembly 4 is slidably disposed on the guide rail 3. The driving device 5 is coupled to the weight assembly 4. The processor is electrically coupled to the driving device 5, and controls the weight assembly 4 to slide along the guide rail 3 via the driving device 5, to change the centroid of the device body 1. When a user plays a game such as a racing game through the mobile device of the present disclosure, when turning or braking, the weight component 4 slides on the guide rail 3 according to an instruction issued by the processor, thus making the centroid of the mobile device of the present disclosure to offset, to produce a feeling similar to when turning or braking a real car, which in turn enhances the immersion of the game and creates a gaming experience similar to 4D movies.

Further, as illustrated in FIG. 1 and FIG. 2, the guide rail 3 includes a first rail 301 and a second rail 302. In some arrangements, the first rail 301 is parallel to a length direction of the device body 1, and the second rail 302 is parallel to a width direction of the device body 1. The first rail 301 and the second rail 302 extend across the device body along the length direction and with direction of the device body 1, respectively. The weight assembly 4 is slidably disposed on the first rail 301 and the second rail 302, respectively. The weight assembly 4 offsets the centroid of the device body 1 by sliding along the first rail 301 and the second rail 302.

The first rail 301 is intersect with and perpendicular to the second rail 302. A spacing 7 is provided between the first rail 301 and the second rail 302 that allows the weight assembly to pass through. When the weight assembly 4 on the first rail 301 is disposed on a side of the first rail 301 adjacent to the second rail 302, and the weight assembly 4 on the second rail 302 is disposed on a side of the second rail 302 adjacent to the first rail 301, a height of the spacing 7 is equal to or greater than a sum of a height of the weight assembly 4 on the first rail 301 and a height of the weight assembly 4 on the second rail 302. Such that the spacing 7 enables the weight assembly 4 on the first rail 301 and the weight assembly 4 on the second rail 302 to pass simultaneously at the intersection of the first rail 301 and the second rail 302 without collision. When weight assembly 4 on the first rail 301 is disposed on a side of the first rail 301 away from the second rail 302, and the weight assembly 4 on the second rail 302 is disposed on a side of the second rail 302 adjacent to the first rail 301, a height of the spacing 7 is equal to or greater than a height of the weight assembly 4 on the second rail 302. Such that the spacing 7 enables the weight assembly 4 on the second rail 302 to pass at the intersection of the first rail 301 and the second rail 302 without collision, as shown in FIG. 2.

In some arrangements, the first rail 301 is intersected with and perpendicular to the second rail 302, and the first rail 301 is connected to the second rail 302 at the intersection. The weight assembly 4 on the first rail 301 is disposed on a side of the first rail 301 away from the second rail 302, and the weight assembly 4 on the second rail 302 is disposed on a side of the second rail 302 away from the first rail 301, thus preventing collision when the weight assembly 4 on the first rail 301 and the weight assembly 4 on the second rail 302 pass through the intersection. In the present disclosure, the first rail 301 and the second rail 302 may be intersected at a non-perpendicular angle, which will not be repeated herein.

In some arrangements, the first rail 301 is disposed at a first angle with a length direction of the device body 1, and the second rail 302 is disposed at a second angle with a width direction of the device body 1. The first angle is between about 0° and about 90°, and the second angle is between about 0° and about 90°. The weight assembly 4 changes the centroid of the device body 1 by sliding along the first rail 301 and the second rail 302.

In some arrangements, as shown in FIG. 1, the intersection of the first rail 301 and the second rail 302 is located at the center of the front side of the device body 1. When the device body 1 is normally used, the weight component 4 on the first rail 301 and the second rail 302 is located at the intersection of the first rail 301 and the second rail 302, so that the center of gravity of the device body 1 is not affected.

In some arrangements, the guide rail 3 may include more than two rails arranged along a circumferential direction of the device body 1. The weight assembly 4 is slidably disposed on each of the rails. The weight assemblies 4 slide on the plurality of rails, respectively, which can more accurately change the center of gravity of the apparatus body 1.

In some arrangements, as illustrated in FIG. 3, the weight assembly 4 includes a battery 401, a support member 402, and a sliding connector 403 that are sequentially connected in the device body 1. In the arrangement, the battery 401 is used as a weight. The support member 402 is used to connect the battery 401 with the sliding connector 403. The sliding connector 403 is a connector having a sliding function, such as a roller. The sliding connector 403 is slidably disposed on the guide rail 3 and drives the battery 401 to move on the guide rail 3. The battery 401 is connected to the outside of the slide connector 403 through the support member 402. The driving device 5 is a permanent magnet DC motor whose power output current can be changed. The driving device 5 is connected to the sliding connector 403. The power output from the driving device 5 is transmitted to the sliding connector 403 to drive it to move along the guide rail 3. Considering the response speed of the driving device 5, the lower limit of the moving speed of the driving device 5 may be limited to move half of the length of the first rail 301 within 0.5 seconds. In the case where the half of the length of the first rail 301 is equal to or greater than 8 cm, the speed at which the driving device 5 drives the sliding link 403 to move is not less than 0.16 m/s.

In some arrangements, as shown in FIG. 1, the battery 401 is electrically connected to the power source connector 6 in the device body 1. The battery 401 can supply power to the device body 1 on the one hand, and does not change the original weight of the device body 1 on the other hand. In addition, the original battery 401 in the device body 1 is equally divided into two, and is respectively installed on the first track 301 and the second track 302 to change the center of gravity of the device body 1.

In some arrangements, other components having a certain weight in the device body 1 may be used instead of the battery 401, such as peripheral Bluetooth components, audio components or related circuits in the device body 1. In some arrangements, a weight may be added directly to the device body 1 instead of the battery 401, which will not be repeated in the present disclosure.

Illustratively, as shown in FIG. 1 and FIG. 3, the device body 1 is provided with a power source connector 6. The support member 402, the sliding connector 403 and the guide rail 3 are all electrical conductors. The battery 401, the support member 402, the sliding connector 403, and the guide rail 3, and the power connector 6 are electrically connected in sequence. Specifically, the support member 402 is provided with a battery-powered line. The support member 402 and the sliding connection member 403 are both metal that has low electrical resistivity. The sliding connection member 403 is in electrically contact with the guide rail 3 to ensure power supply. The guide rail 3 is electrically connected to the power connector 6. The current of the battery 401 flows into the power connector 6 through the support member 402, the slide connector 403, and the guide rail 3 to supply power to the device body 1.

Figure 4:
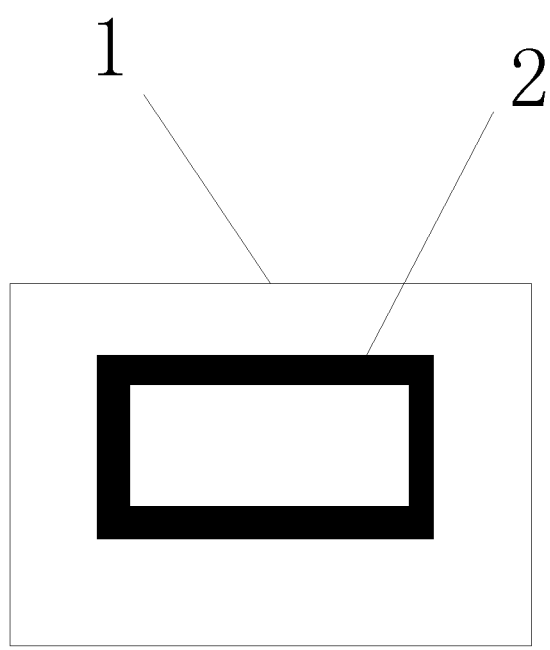
FIG. 4 is a structural schematic view of the device body according to the present disclosure.
Figure 5:
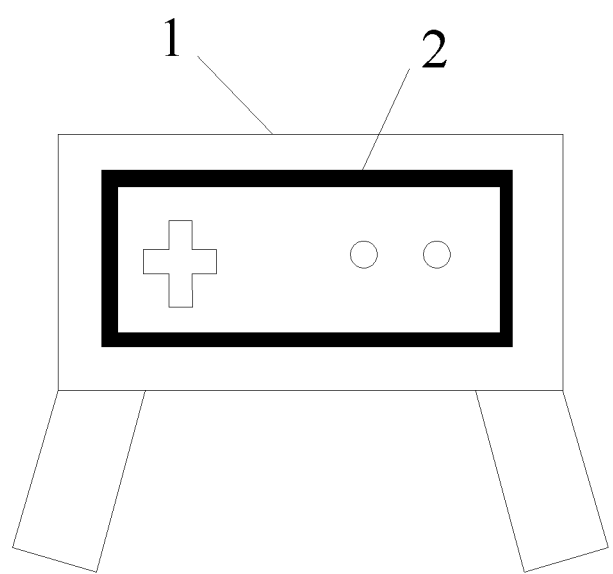
FIG. 5 is another structural schematic view of the device body according to the present disclosure.

In some arrangements, as shown in FIG. 4 and FIG. 5, the device body 1 includes a mobile phone, a gamepad, a virtual helmet, and a handheld computer or a handheld game console. In some arrangements, the device body 1 is a handheld computer. A centroid changing device 2 is provided on the handheld computer, as shown in FIG. 4. In some arrangements, the device body 1 is a gamepad, and a centroid changing device 2 is provided on the gamepad, as shown in FIG. 5.

In some arrangements, the device body 1 is provided with a gyroscope and/or a button. The gyroscope and/or the button are electrically connected to the processor. The user presses the button or triggers the gyroscope to sample the angular velocity of the device 1 by swinging the device body, to change the centroid of the device body.

The present disclosure further provides a method of changing centroid of any one of the above mobile devices. The method includes: reading, by the processor, instruction for changing the centroid sent from the device body 1; and according to the instruction for changing the centroid, controlling, by the processor, the weight assembly 4 to slide on the guide rail 3 through the driving device 5.

In some arrangements, during a normal operation of the device body 1, the weight assembly 4 is located at a center of the front side of the device body 1 before the processor reads the instruction for changing the centroid, such that the center of gravity of the device body 1 will not be affected.

Illustratively, a gyroscope and/or a button may be provided on the device body 1, and the gyroscope and/or the button may be electrically connected to the processor. The instruction for changing the centroid sent from the device body 1 may be instructions sent from the button of the device body 1 and/or deflection data of the gyroscope.

In particular, taking the device body 1 as a virtual helmet and a gamepad as an example, the virtual helmet and the gamepad are each provided with a centroid changing device 2. The gamepad is provided with a gyroscope and at least one button. The button includes an acceleration button and a deceleration button. When the user plays a game such as a racing game through the virtual helmet and the game handle and when the accelerator button is pressed, the processor reads the instruction for changing the centroid issued by the accelerator button, and the weight component 4 in the centroid changing device 2 slides along the width direction of the virtual helmet and the gamepad, that is, slides back and forth. The weight assembly 4 quickly reaches the end of the guide rail 3 to simulate the push back feeling during acceleration. When the deceleration button is pressed, the processor reads the instruction for changing the centroid from the deceleration button, and the weight assembly 4 quickly reaches the foremost end of the guide rail 3 to simulate the feeling of the forward stroke when braking.

When the gamepad is flipped left and right, the gyroscope inside it collects the angular velocity of the gamepad rotation. In some arrangements, the gyroscope will collect the angular change within 0.01 s and calculate the angular velocity. Since the duration of one movement of the hand is much longer than 0.01 s, the rotation angle is calculated by taking a sampling period of fifty sampling periods, and then the processor reads the deflection data of the gyroscope and controls the driving device 5 to move the weight component 4 by a proportional distance to the corresponding direction, i.e., sliding left and right. The weight assembly 4 quickly reaches the end of the guide rail 3 to the left or right to simulate the feeling of the car turning. In this arrangement, when the game handle is turned left or right, the calculation formula of the moving distance of the weight component 4 is $D=a*\theta$. D is the distance that the weight component 4 moves on the guide rail 3, a is a proportional coefficient, and $\theta$ is the angle by which the gamepad is turned. In some arrangements, a counterclockwise rotation may have a positive value.

Each time the device body 1 is turned on. The weight component 4 is reset and held at the center of the front side of the device body 1 to ensure that the center of gravity of the device body 1 is not affected. Then, if the game does not start, the weight component 4 continues to remain in the reset state. When the game starts, the processor reads the command issued by the button on the device body 1 and the deflection data of the gyroscope, and controls the movement of the weight component 4. If the game is not over, the above steps are repeated. When the game is over, the weight assembly 4 continues to reset and remains at the center of the front of the device body 1 to maintain the balance of the virtual helmet and the gamepad.

Arrangements of the present disclosure may have the following advantages.

In the present disclosure, the weight assembly may slide along the guide rail on the device body, to change the centroid of the device body 1. When a user plays a game such as a racing game through the mobile device of the present disclosure, when turning or braking, the weight component slides on the guide rail according to an instruction issued by the processor, thus making the centroid of the mobile device of the present disclosure to offset, to produce a feeling similar to when turning or braking a real car, which in turn enhances the immersion of the game and creates a gaming experience similar to 4D movies.

Although arrangements of the present disclosure are described above, the above arrangements are implementations for better understanding of the present disclosure only, while the present disclosure is not limited thereto. Various modifications and variations in the form and details are possible to those of ordinary skill in the art without departing from the spirit and essence of the present disclosure. The scope of the disclosure is to be determined by the scope of the appended claims.

What is claimed is:

1. A mobile device comprising: a device body comprising a processor disposed therein; a centroid changing device comprising a guide rail disposed on the device body, wherein the guide rail comprises a first rail and a second rail, the first rail is parallel to a length direction of the device body, the second rail is parallel to a width direction of the device body, wherein the first rail si intersected with the second rail; a weight assembly slidably disposed on the first rail and the second rail, respectively; and a driving device coupled to the weight assembly, wherein the processor is electrically coupled to the driving device, and controls the weight assembly to slide along the guide rail via the driving device, to change the centroid of the device body, wherein the weight assembly comprises a battery, a support member, and a sliding connector that are sequentially connected in the device body, and the sliding connector is slidably disposed on the guide rail.

2. The mobile device according to claim 1, wherein the first rail is perpendicular to the second rail.

3. The mobile device according to claim 1, wherein the first rail is disposed at a first angle with a length direction of the device body, and the second rail is disposed at a second angle with a width direction of the device body, wherein the first angle is between 0° and 90", and the second angle is between 0° and 90°.

4. The mobile device according to claim 2, wherein an intersection between the first rail and the second rail is located at a center of front side of the device body.

5. The mobile device according to claim 2, wherein a spacing is provided between the first rail and the second rail that allows the weight assembly to pass through.

6. The mobile device according to claim 5, wherein a height of the spacing is equal to or greater than a sum of a height of the weight assembly on the first rail and a height of the weight assembly on the second rail.

7. The mobile device according to claim 2, wherein the weight assembly on the first rail is disposed on a side of the first rail away from the second rail, and the weight assembly on the second rail is disposed on a side of the second rail away from the first rail.

8. The mobile device according to claim 1, wherein the guide rail extends across the device body.

9. The mobile device according to claim 1, wherein a power source connector is provided in the device body, and the power source connector is electrically connected to the battery.

10. The mobile device according to claim 1, wherein the device body comprises a mobile phone, a gamepad, a virtual helmet, a handheld computer or a handheld game console.

11. The mobile device according to claim 1, wherein the device body is provided with at least one of a button and a gyroscope.

12. A method of changing centroid of the mobile device according to claim 1, comprising:
  reading, by the processor, instruction for changing the centroid sent from the device body; and
  according to the instruction for changing the centroid, controlling, by the processor, the weight assembly to slide on the guide rail through the driving device.

13. The method according to claim 12, wherein, the weight assembly is located at a center of front side of the device body before the processor reads the instruction for changing the centroid.

* * * * *